Dec. 8, 1959 M. R. LEWIS 2,915,905
STEP-BY-STEP RATCHET DRIVE
Original Filed July 25, 1955

INVENTOR.
MELVIN R. LEWIS
BY
John W. Michael
ATTORNEYS

United States Patent Office 2,915,905
Patented Dec. 8, 1959

2,915,905

STEP-BY-STEP RATCHET DRIVE

Melvin R. Lewis, Elmhurst, Ill., assignor, by mesne assignments, to Controls Company of America, Schiller Park, Ill., a corporation of Delaware Original application July 25, 1955, Serial No. 524,013. Divided and this application April 18, 1958, Serial No. 732,761

2 Claims. (Cl. 74—125)

My invention relates to improvements in a step-by-step ratchet drive used in rotary electrical circuit timing mechanisms for automatically cycling a series of operations to be performed as by a washing machine or other apparatus.

This application is a divison of application Serial Number 524,013, filed July 25, 1955.

The present invention contemplates an improvement in the step-by-step ratchet drive used in the motor-driven timing mechanism disclosed in Patent No. 2,656,424. Devices of this type are generally driven by a synchronous motor, which automatically drives the circuit-controlling mechanism through a complete cycle to perform a series of successive operations. Such devices are provided with a manually controllable selector which may be manipulated to supersede automatic operation, so as to vary the sequence of operations. While it is intended that the selector be rotated in the normal driven direction of rotation only and the mechanism is constructed for only such rotation, frequently an operator will disregard operating instructions and rotate the selector with an overpowering force in an opposite direction despite the relatively strong resistance against such rotation, causing injury to the device and requiring replacement of the same in whole or in part.

Accordingly, it is an object of my invention to provide means in a device of the foregoing character, which permits manual rotation of the selector in a direction opposite to the normal driven direction of rotation with an overpowering force without in any way causing injury to the parts.

Another object of my invention is the provision of novel means for controlling the acceleration of the actuating lever to assure only single step-by-step actuation of the ratchet drive.

Another object of my invention is the provision of a device of the foregoing character, which is simple in construction, efficient in operation and economical to manufacture.

Other and further objects and advantages of my invention will become apparent from the following description when considered in connection with the accompanying drawings, in which—

Figure 1:
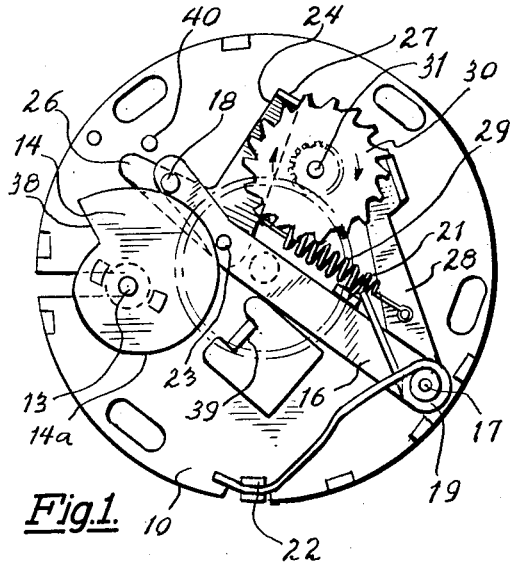
Fig. 1 is a front elevational view of a motor-driven step-by-step ratchet drive embodying my invention.
Figure 2:
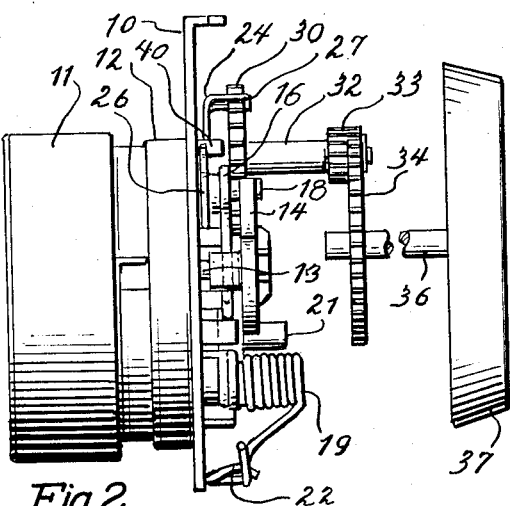
Fig. 2 is a side elevational view of the same, showing a manually engageable selector knob associated therewith.

Referring to the drawings, the numeral 10 indicates a mounting plate on which is secured a conventional type synchronous motor 11 associated with a train of reduction gears enclosed in a housing 12 and terminating in a shaft 13 projecting through the plate. On the extremity of the shaft is fixed a cam 14 having a contour as illustrated in the drawings and hereinafter to be described. A lever 16 pivoted as at 17 on the plate carries a laterally extending pin 18 which is adapted to ride on the periphery of the cam as the latter describes its cyclic rotation. A torsion spring 19 coaxial with the pivotal axis of the lever 16 has one extremity engaging a lug 21 carried on the lever 16, the other extremity of said spring being in engagement with a lug 22 struck out from the plate 10. Thus, the pin follower 18 is normally urged into engagement with the periphery of the cam 14.

The lever 16 carries at an intermediate position of its length a stud pivot 23 on which swings the feed pawl 24. The said feed pawl includes an integral arm 26 extending from its pivotal connection substantially at a right angle to the longitudinal axis of the feed pawl. The extremity 27 of the feed pawl is bent at a right angle to the plane thereof. A detent arm 28 also pivoted as at 17 is connected by a coil spring 29 with the feed pawl 24, so as to exert a mutually yieldable force urging the feed pawl 24 and detent arm 28 into engagement with the teeth of a feed ratchet 30 which is rotatably mounted on a stud shaft 31 supported in the plate 10. The ratchet is an integral part of a bushing member 32 which includes a driving pinion 33. The pinion 33 is intended to mesh with a gear 34 fixed on a shaft 36, which may carry cam means for effecting actuation of a plurality of switches according to a predetermined sequence. A manually controllable selector knob 37 is fixed to the shaft 36 and affords means by which automatic operation of the device may be superseded.

The cam 14 has a substantially involute periphery 14$^a$ and a drop surface 38 which forms an angle of approximately 6° with a radial line passing through the axis of shaft 13 and the upper point of intersection of the periphery 14$^a$ with the drop surface 38. (See Figs. 3 and 4.)

In normal automatic operation, rotation of the cam 14 in a clockwise direction, as viewed in Fig. 1, during the ascendency of the follower pin 18 effects rocking of the arm 16 about its pivot in a clockwise direction, causing the feed pawl 24 to move to the right to override the succeeding adjacent tooth of the ratchet 30 and then to engage therewith when the pin follower 18 has reached the highest point of the cam. As the follower 18 moves on the cam drop 38 the spring 19 effects a relatively instantaneous swinging of the lever 16 in a counterclockwise direction, effecting a fractional rotation of the ratchet in a counterclockwise direction. The acceleration of the feed pawl 24, the ratchet 30 and the rotating parts driven thereby is controlled by the particular angular inclination of the drop surface 38, the follower 18 being caused to engage said drop surface substantially throughout the length thereof. By controlling the acceleration in the above manner the inertia of movement of the ratchet 30 and rotating parts is restricted thereby preventing ratchet movement exceeding a distance of one tooth. Without such control as above described excessive ratchet rotation has been experienced in devices of this type. As each step-by-step advance is attained by the ratchet 30, the latter is prevented from rotating clockwise (Fig. 1) with the forward stroke of the feed pawl 24 by the positive blocking engagement of the end of the detent arm 28.

When it is desired to override automatic operation by manual intervention, the selector knob 37 is rotated so as to effect rotation of the ratchet 30 in a counterclockwise direction, as viewed in Fig. 1. During such rotation, corresponding to the normal driven direction of rotation the feed pawl 24 and detent arm 28 are caused to overpower their mutual spring pawl 29 and will click idly as the teeth of the ratchet pass under them.

The tension of the spring 29 is required to be but very mild in order to accomplish the purposes of the detent arm 28 in positively engaging a tooth of the ratchet 30 and for the purpose of urging the feed pawl 24 into engagement as it rides from one tooth to the next during successive actuations of the lever 16. Movement of the lever 16 in a counterclockwise direction about its pivot when the follower 18 on the lever 16 reaches the drop 38 on the cam 14 is limited by a lug 39 struck out from the plane of the plate 10 and projecting into the path of travel of the lever 16.

Figure 3:
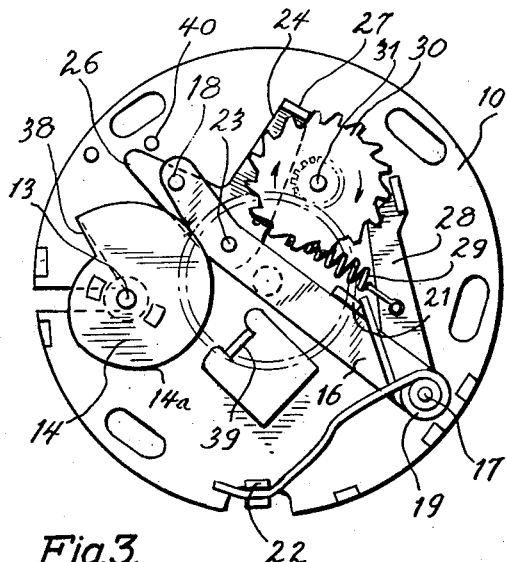
Figs. 3 and 4 are views similar to Fig. 1, but showing the parts in different relative positions of operation.
Figure 4:
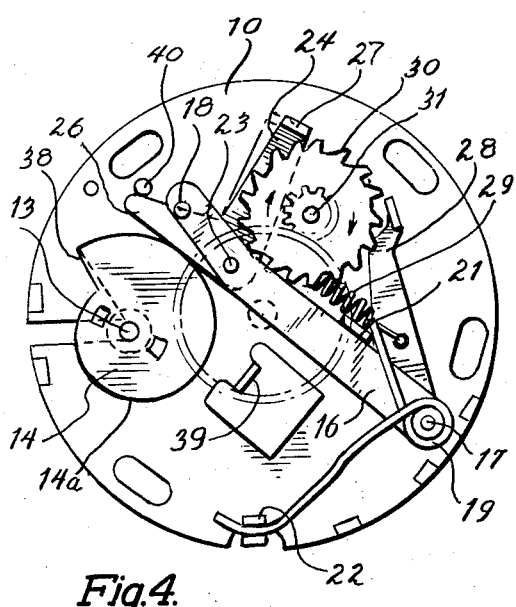

In the event that an operator inadvertently rotates the selector knob 37 in a direction opposite to the normal driven direction of rotation, such as would tend to turn the ratchet 30 clockwise as viewed in Fig. 5, the initial movement of the ratchet 30, because of the slight rearward rake of the leading edges 41 of the teeth (during clockwise rotation) and the relative position of the detent arm 28, will effect a slight camming action on the detent arm 28, causing the same to assume a momentary position out of engagement with the face of a tooth, as illustrated in Fig. 3, in other words, to assume a non-blocking position. Further rotation of the ratchet 30 in a clockwise direction will rock the lever 16 counterclockwise, as viewed in Fig. 4, and correspondingly move the feed pawl until the arm 26 engages a stop 40 anchored in the plate 10. This action causes the feed pawl 24 to rock counterclockwise in the position illustrated in Fig. 4, wherein the pawl extremity 27 will just wipe over the tooth with which it is engaged, so that the ratchet may be rotated a distance equal to the space of one tooth before the feed pawl 24 is urged into engagement with the next succeeding tooth by the spring 29. It will be apparent that the feed pawl 24 and detent arm 28 cooperate to function as an escapement mechanism, so that continued application of torque to the ratchet 30 through the instrumentality of the selector knob 37 will effect repetition of the operations just described. It will be understood that in the reverse rotation of the mechanism as above described, both springs 19 and 29 must be overpowered, hence there is afforded a substantial resistance to rotation in a direction opposite the normal driven direction of rotation. However, the feed pawl and detent arm under such conditions are caused to just clear the teeth of the ratchet, thereby preventing injury to the device.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claims.

I claim:

1. In a step-by-step ratchet drive of the type having a tolling cam, means for driving said cam, a pivoted lever having a follower adapted to engage the periphery of said cam, a ratchet, a feed pawl pivoted to said lever and having an extremity engageable with said ratchet, a detent arm pivoted to said support and adapted to engage said ratchet, spring means biasing said pawl and detent into engagement with said ratchet, and other spring means normally urging said lever in a direction to cause said follower to engage said periphery, the improvement which comprises means for limiting ratchet movement to single successive steps, comprising a nearly radial drop surface on said cam so constructed and arranged as to be engaged by said follower throughout the drop to control the acceleration of said lever to restrict the inertia of movement of said ratchet and rotating parts driven thereby.

2. In a step-by-step ratchet drive of the type having a tolling cam having an involute periphery, means for driving said cam, a pivoted lever having a follower adapted to engage the periphery of said cam, a ratchet, a feed pawl pivoted to said lever and having an extremity engageable with said ratchet, a detent arm pivoted to said support and adapted to engage said ratchet, spring means biasing said pawl and detent into engagement with said ratchet, and other spring means normally urging said lever in a direction to cause said follower to engage said cam periphery, the improvement which comprises means for limiting ratchet movement to single successive steps, comprising a nearly radial drop surface connecting different elevations of said periphery, said drop surface being so constructed and arranged as to be engaged by said follower throughout the drop to control the acceleration of said lever to restrict the inertia of movement of said ratchet and rotating parts driven thereby.

References Cited in the file of this patent

UNITED STATES PATENTS

| | | |
|---|---|---|
| 1,606,929 | Fernandes | Nov. 16, 1926 |
| 2,080,443 | Sperberg | May 18, 1937 |
| 2,208,831 | Bassett | July 23, 1940 |
| 2,744,413 | Schneider | May 8, 1956 |

FOREIGN PATENTS

| | | |
|---|---|---|
| 983,315 | France | June 21, 1951 |

UNITED STATES PATENT OFFICE

CERTIFICATE OF CORRECTION

Patent No. 2,915,905 December 8, 1959

Melvin R. Lewis

It is hereby certified that error appears in the printed specification of the above numbered patent requiring correction and that the said Letters Patent should read as corrected below.

Column 4, lines 7 and 24, before "detent", each occurrence, insert -- pivoted --; lines 7, 24, and 25, strike out "pivoted to said support and --, each occurrence.

Signed and sealed this 17th day of May 1960.

(SEAL)
Attest:

KARL H. AXLINE
Attesting Officer

ROBERT C. WATSON
Commissioner of Patents